US012676920B1

(12) United States Patent
Sibbesen et al.

(10) Patent No.: US 12,676,920 B1
(45) Date of Patent: Jul. 7, 2026

(54) COMMUNICATION ADAPTER APPARATUS

(71) Applicant: Pioneer Square Brands, Inc., High Point, NC (US)

(72) Inventors: Soren Sibbesen, Jamestown, NC (US); Brian Lewis Piper, Seattle, WA (US); Quentin Wade Forbes, Winston Salem, NC (US); Richard Kennedy, Antioch, TN (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 19/433,820

(22) Filed: Dec. 28, 2025

Related U.S. Application Data

(60) Provisional application No. 63/789,384, filed on Apr. 15, 2025.

(51) Int. Cl.
*H01R 31/06* (2006.01)
*H04L 69/08* (2022.01)

(52) U.S. Cl.
CPC .................................... *H04L 69/08* (2013.01)

(58) Field of Classification Search
CPC .......... H01R 31/06; H01R 13/00; H04L 69/08
See application file for complete search history.

(56) References Cited

U.S. PATENT DOCUMENTS

| | | | | | |
|---|---|---|---|---|---|
| 6,612,874 | B1 * | 9/2003 | Stout | ...................... | H01R 35/02 439/11 |
| 7,485,007 | B1 * | 2/2009 | Nee | ........................ | H01R 35/02 439/11 |
| 8,382,666 | B1 * | 2/2013 | Mao | .................... | A61B 5/14551 600/202 |
| 11,613,185 | B1 * | 3/2023 | Wiegman | ................ | B60L 53/16 320/109 |
| 11,973,288 | B1 * | 4/2024 | Palombini | ............. | B60L 53/305 |
| 2006/0011368 | A1 * | 1/2006 | Maruyama | ........... | H01R 13/465 174/33 |
| 2011/0053526 | A1 * | 3/2011 | Strei | ...................... | H05K 5/064 455/90.3 |
| 2012/0307981 | A1 * | 12/2012 | Larkin | ................. | G01R 1/0416 379/27.01 |
| 2019/0097362 | A1 * | 3/2019 | Haba | ....................... | G06N 3/063 |
| 2021/0102692 | A1 * | 4/2021 | Doheny | .................. | F21V 23/06 |
| 2023/0030251 | A1 * | 2/2023 | Mecham | ................ | H01R 24/76 |
| 2025/0267811 | A1 * | 8/2025 | Brantingham | ....... | H05K 5/0278 |
| 2025/0359786 | A1 * | 11/2025 | Al-Ali | .................... | A61B 5/746 |

* cited by examiner

*Primary Examiner* — Abdullah A Riyami
*Assistant Examiner* — Nelson R. Burgos-Guntin
(74) *Attorney, Agent, or Firm* — Grandview Law

(57) ABSTRACT

A communication adapter system couples a first communication interface to a second communication interface while providing controlled flexing between ends. The system includes a port assembly, a plug assembly, and an intermediate flex assembly. The port and plug assemblies may house standardized or proprietary connectors, including but not limited to USB Type-A, USB Type-C, HDMI, DisplayPort, Ethernet (RJ45), audio jacks, and Lightning-type connectors supporting corresponding data and power protocols. The flex assembly includes grooves and ribs formed in an elastomeric body to allow repeated bending and may optionally enclose a plastically deformable member that retains a user-selected bent configuration for strain relief. Exterior curvilinear surfaces, ridges, and textured grip regions facilitate ergonomic handling and tactile end identification.

17 Claims, 13 Drawing Sheets

COMMUNICATION ADAPTER APPARATUS

In one or more aspects a communication adapter system for coupling a first communication interface and a second communication interface, the communication adapter system including (I) a port assembly couplable with the first communication interface; (II) a plug assembly couplable with the second communication interface; and (III) a flex assembly extending between the port assembly and the plug assembly and configured to allow the port assembly and the plug assembly to flex with respect to one another, wherein the first communication interface and the second communication interface are each configured to carry a communication signal associated with at least one communication protocol.

In implementations the port assembly includes a first curvilinear side, a second curvilinear side positioned opposite from the first curvilinear side, a top extending between the first curvilinear side and the second curvilinear side, and a bottom extending between the first curvilinear side and the second curvilinear side.

In implementations the top of the port assembly includes a narrow portion positioned closer to the flex assembly than to a port end of the port assembly, a middle portion extending from the narrow portion, and an end portion extending from the middle portion toward the port end of the port assembly.

In implementations the port assembly includes a port end having a port opening, and
a plurality of port-end sides surrounding the port opening, wherein the plurality of port-end sides are arranged to key the port opening for a single insertion orientation of a mating connector.

In implementations the flex assembly includes a first circumferential groove,
a first circumferential rib adjacent to the first circumferential groove, a second circumferential groove adjacent to the first circumferential rib, and a second circumferential rib adjacent to the second circumferential groove, wherein the first circumferential groove and the second circumferential groove locally reduce a wall thickness of the flex assembly to increase bending compliance of the flex assembly.

In implementations the flex assembly defines a medial region having a reduced cross-sectional profile relative to adjacent portions of the port assembly and adjacent portions of the plug assembly, and wherein the medial region is positioned substantially midway between the port assembly and the plug assembly.

In implementations the plug assembly includes a first plug-side surface having a first tapered portion, a first ridge portion, and a second tapered portion, and a second plug-side surface positioned opposite from the first plug-side surface and having a second tapered portion, a second ridge portion, and a third tapered portion, wherein the first ridge portion and the second ridge portion define tactile features for identifying the plug assembly by touch.

In implementations the plug assembly further includes a plug top having a first inclined portion extending from the flex assembly, a plug ridge portion extending from the first inclined portion, and a second inclined portion extending from the plug ridge portion toward a plug end of the plug assembly, wherein the plug ridge portion is aligned with at least one of the first ridge portion and the second ridge portion.

In implementations the port assembly and the plug assembly are formed of a rigid or semi-rigid polymer material, and wherein the flex assembly is formed of an elastomeric material having greater flexibility than the rigid or semi-rigid polymer material, wherein the flex assembly is configured to flex in response to a bending force applied between the port assembly and the plug assembly and to return toward an unflexed configuration when the bending force is removed.

In implementations at least one of the first communication interface and the second communication interface is configured to carry at least one communication protocol selected from the group consisting of: USB 1.1, USB 2.0, USB 3.0, USB 3.1, USB 3.2, USB4, a USB Type-A connector protocol, a USB Type-B connector protocol, a USB micro-B connector protocol, a USB mini-B connector protocol, a USB Type-C connector protocol, Thunderbolt 3, Thunderbolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol.

In one or more aspects a communication adapter system for coupling a first communication interface and a second communication interface, the communication adapter system including (I) a port assembly couplable with the first communication interface; (II) a plug assembly couplable with the second communication interface; and (III) a flex assembly extending between the port assembly and the plug assembly, the flex assembly including (A) an elastomeric body, and (B) an internal plastically deformable member positioned within the elastomeric body, wherein the flex assembly is configured to be bent into a flexed configuration and to retain the flexed configuration until the flex assembly is re-bent into a different configuration, and wherein at least one of the first communication interface and the second communication interface is configured to carry a communication protocol.

In implementations the internal plastically deformable member includes a metal wire embedded within the elastomeric body of the flex assembly.

In implementations the metal wire extends along a longitudinal axis of the flex assembly from a region adjacent to the port assembly to a region adjacent to the plug assembly, and wherein the metal wire has a yield strength selected to allow manual bending by a user while resisting unintentional bending during normal use.

In implementations the elastomeric body of the flex assembly surrounds the internal plastically deformable member and defines a plurality of circumferential grooves and circumferential ribs, wherein the circumferential grooves are configured to concentrate bending of the flex assembly near the internal plastically deformable member, and wherein the circumferential ribs are configured to maintain an external profile of the flex assembly under bending.

In implementations the port assembly is overmolded onto a first end of the elastomeric body, wherein the plug assembly is overmolded onto a second end of the elastomeric body opposite from the first end of the elastomeric body, and wherein the overmolding forms a unitary structure that resists separation of the port assembly, the flex assembly, and the plug assembly when the flex assembly is repeatedly bent into and out of the flexed configuration.

In implementations at least one of the first communication interface and the second communication interface is configured to carry at least one communication protocol selected from the group consisting of USB 1.1, USB 2.0, USB 3.0, USB 3.1, USB 3.2, USB4, a USB Type-A connector proto-col, a USB Type-B connector protocol, a USB micro-B connector protocol, a USB mini-B connector protocol, a USB Type-C connector protocol, Thunderbolt 3, Thunder-bolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol, and wherein the flex assembly is configured to retain a flexed configuration that provides strain relief for at least one connector associated with the communication protocol.

In one or more aspects a communication adapter system for coupling a first communication interface and a second communication interface, the communication adapter sys-tem including (I) a port assembly couplable with the first communication interface; (II) a plug assembly couplable with the second communication interface; (III) a flex assem-bly extending between the port assembly and the plug assembly; and (IV) textured grip regions including (A) a first textured grip region positioned on the port assembly, and (B) a second textured grip region positioned on the plug assem-bly, wherein the first textured grip region and the second textured grip region are configured to increase friction between the communication adapter system and a hand of a user, and wherein the communication adapter system is configured for use with at least one communication protocol.

In implementations the first textured grip region includes a first textured top portion and a first textured bottom portion on the port assembly, wherein the second textured grip region includes a second textured top portion and a second textured bottom portion on the plug assembly, and wherein the first textured top portion and the second textured top portion are aligned with one another along a longitudinal axis of the communication adapter system.

In implementations at least one of the first textured grip region and the second textured grip region includes a plurality of raised ridges extending in a direction transverse to a longitudinal axis of the communication adapter system, and wherein at least one of the raised ridges is aligned with a ridge portion of the plug assembly configured to be engaged by a thumb of the user.

In implementations the port assembly includes a port opening sized and shaped to receive a connector for at least one communication protocol selected from the group con-sisting of: USB 1.1, USB 2.0, USB 3.0, USB 3.1, USB 3.2, USB4, a USB Type-A connector protocol, a USB Type-B connector protocol, a USB micro-B connector protocol, a USB mini-B connector protocol, a USB Type-C connector protocol, Thunderbolt 3, Thunderbolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol, and wherein the plug assembly includes a plug end sized and shaped to mate with a connector for at least one communication protocol selected from the group consisting of: USB 1.1, USB 2.0, USB 3.0, USB 3.1, USB 3.2, USB4, a USB Type-A connector protocol, a USB Type-B connector protocol, a USB micro-B connector protocol, a USB mini-B connector protocol, a USB Type-C connector protocol, Thunderbolt 3, Thunderbolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol.

In addition to the foregoing, other aspects are described in the claims, drawings, and text forming a part of the disclo-sure set forth herein. Various other aspects are set forth and described in the teachings such as text (e.g., claims and/or detailed description) and/or drawings of the present disclo-sure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advan-tages of the devices and/or processes and/or other subject matter described herein will become apparent in the teach-ings set forth herein.

BRIEF DESCRIPTION OF THE FIGURES

For a more complete understanding of implementations, reference now is made to the following descriptions taken in connection with the accompanying drawings. The use of the same symbols in different drawings typically indicates simi-lar or identical items, unless context dictates otherwise.

With reference now to the figures, shown are one or more examples of Communication Adapter Apparatus, articles of manufacture, compositions of matter for same that may provide context, for instance, in introducing one or more processes and/or devices described herein.

DETAILED DESCRIPTION

Figure 1:
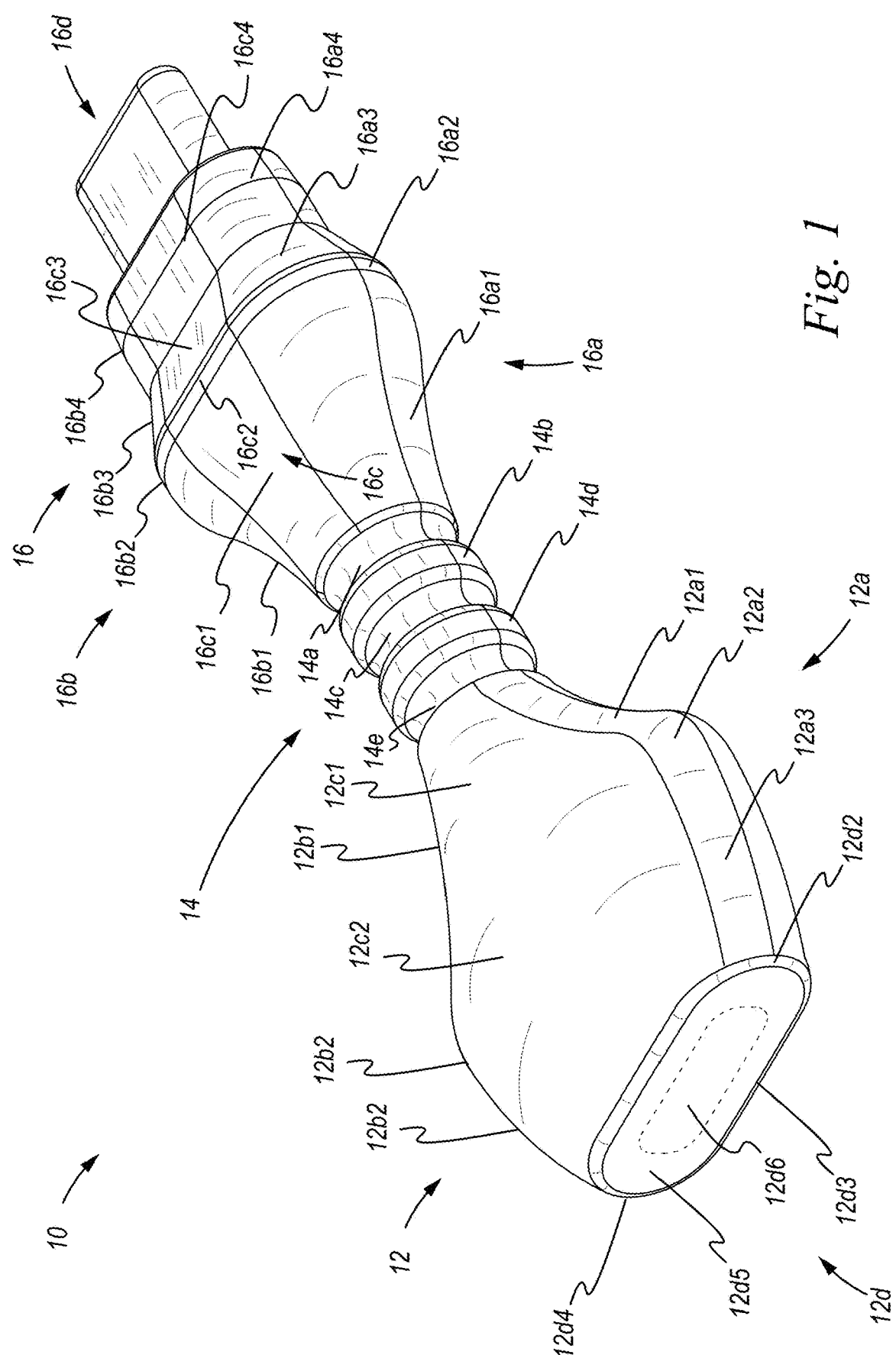
FIG. 1 is a port-end perspective view of a communication adapter.

In the following detailed description, reference is made to the accompanying drawings, which form a part hereof. In the drawings, similar symbols typically identify similar components, unless context dictates otherwise. The illustra-tive implementations described in the detailed description, drawings, and claims are not meant to be limiting. Other implementations may be utilized, and other changes may be made, without departing from the spirit or scope of the subject matter presented here.

In general, the present disclosure relates to a communication adapter 10, depicted in FIG. 1, that mechanically and electrically couples a first communication interface to a second communication interface. In various implementations, adapter 10 may be used to interconnect a cable plug to a device port, a device port to a different type of device port, or two cables to one another, while providing strain relief and user-friendly handling features. The adapter 10 includes a port assembly 12 at a first longitudinal end, a plug assembly 16 at a second longitudinal end opposite the port assembly 12, and a flex assembly 14 disposed between the port assembly 12 and the plug assembly 16. The flex assembly 14 allows limited bending and torsional movement between the port assembly 12 and the plug assembly 16, thereby reducing stresses transmitted to the respective connectors. Each of the first communication interface and the second communication interface is configured to carry a communication signal associated with at least one communication protocol as described herein.

In representative implementations, the port assembly 12 and plug assembly 16 may be formed of a relatively rigid or semi-rigid polymer material, such as a glass-filled nylon or other engineering thermoplastic, while the flex assembly 14 includes an elastomeric body formed of a more compliant elastomeric material, such as a thermoplastic elastomer (TPE) or thermoplastic polyurethane (TPU). The flex assembly 14 is configured to be repeatedly flexed relative to the port assembly 12 and plug assembly 16 so that the overall adapter 10 can be bent into different shapes in use. In some versions the elastomeric material is sufficiently resilient that, after being flexed, the flex assembly 14 tends to return toward an unflexed or neutral shape when external forces are removed. In other versions, the flex assembly 14 further includes one or more malleable or plastically deformable elements positioned within the elastomeric body, such as an embedded copper, aluminum, or low-yield steel wire, or a strip or spine of a malleable metal or alloy, so that the flex assembly 14 can be bent into a selected flexed configuration and retain that flexed configuration until the user intentionally re-bends the adapter 10 into a different configuration. The combination of differing materials provides both mechanical protection and user comfort, while the ability to either spring back or hold a set bend can be selected according to the needs of a particular application. The exterior geometry of adapter 10 is generally curvilinear, with strategically located tapers, ridges, and textures that guide the user's grip and visually indicate the function of each end of the adapter.

In some implementations, an internal conductor arrangement extends continuously from port assembly 12 through flex assembly 14 to plug assembly 16. The conductors may be arranged in a twisted pair configuration, a coaxial configuration, a multi-conductor flat configuration, or another suitable configuration consistent with a communication protocol employed by the first and second communication interfaces. The communication protocol can, for example, be at least one communication protocol selected from the group consisting of: USB 1.1, USB 2.0, USB 3.0, USB 3.1, USB 3.2, USB4, a USB Type-A connector protocol, a USB Type-B connector protocol, a USB micro-B connector protocol, a USB mini-B connector protocol, a USB Type-C connector protocol, Thunderbolt 3, Thunderbolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol. The exterior structures of the port assembly 12, flex assembly 14, and plug assembly 16 can therefore be adapted to different connector geometries and sizes associated with these protocols while maintaining a common ergonomic and visual design language.

In implementations intended for high-speed or differential protocols, such as USB 3.2, USB4, Thunderbolt, HDMI 2.1, DisplayPort, or multi-gigabit Ethernet, the internal conductor arrangement and the geometry of the flex assembly 14 can be selected to maintain controlled impedance, reduce crosstalk, and preserve signal integrity under repeated bending. For example, the flex assembly 14 may maintain a relatively constant cross-sectional shape along at least a portion of its length, and the grooves and ribs described herein can be dimensioned such that local variations in conductor spacing remain within acceptable tolerances for the relevant communication protocol.

Referring now to the drawings, like reference numerals refer to like elements throughout the several views. The figures are not necessarily to scale, and certain features may be exaggerated for clarity of illustration. Directional terms such as "top," "bottom," "side," "port-end," and "plug-end" are used for convenience of description with respect to the illustrated orientations in the figures and are not intended to be limiting.

Turning further to FIG. 1, depicted therein is a port-end perspective view of communication adapter 10 including port assembly 12, flex assembly 14, and plug assembly 16.

In the port-end perspective view of FIG. 1, adapter 10 is shown with port assembly 12 oriented toward the viewer such that port 12d6 is visible at a front port end 12d, and plug assembly 16 extends rearwardly and slightly upwardly from flex assembly 14. The port assembly 12 and plug assembly 16 are joined by the centrally located flex assembly 14, which in this view appears as a sequence of alternating grooves and ribs extending circumferentially around a central body. The flex assembly 14 defines a medial region of reduced cross-section relative to portions of the port assembly 12 and plug assembly 16, thereby visually distinguishing the flexible region from the more rigid end regions. The curvilinear outer surfaces of port assembly 12 and plug assembly 16 create a continuous, flowing profile that minimizes sharp edges and corners, improving both aesthetics and comfort in the user's hand.

In implementations port assembly 12 includes curvilinear side 12a with angled side 12a1, corner 12a2, and tapered side 12a3; curvilinear side 12b with tapered side 12b1, corner 12b2, and tapered side 12b3; top 12c with narrow portion 12c1, middle portion 12c2, and end portion 12c3; and port end 12d with side 12d1, side 12d2, side 12d3, side 12d4, and side 12d5; and port 12d6.

The curvilinear side 12a of port assembly 12 transitions from an angled side 12al into corner 12a2 and then into tapered side 12a3, thereby defining a smooth contour that blends into adjacent surfaces and reduces snagging when the adapter 10 is inserted near other objects or cable bundles. On the opposite side, curvilinear side 12b includes tapered side 12b1 leading into corner 12b2 and continuing into tapered side 12b3, providing a complementary profile so that adapter 10 may be comfortably gripped regardless of which side is facing the user. The top 12c incorporates narrow portion 12cl near the flex assembly 14, middle portion 12c2 defining a broader crown region, and end portion 12c3 progressing toward port end 12d. In implementations, the narrow portion 12*cl* visually and tactilely delineates the transition from flex assembly 14 to the more rigid port assembly 12, whereas middle portion 12*c*2 and end portion 12*c*3 collectively create a dome-like surface that resists wear and protects internal structures.

At the port end 12*d*, sides 12*d*1, 12*d*2, 12*d*3, 12*d*4, and 12*d*5 cooperate to create a generally polygonal or rounded-rectangular opening around port 12*d*6. The port 12*d*6 is dimensioned and shaped to receive or form a receptacle for a mating communication connector. In some embodiments, port 12*d*6 is sized and shaped as a USB Type-A receptacle configured for USB 2.0, USB 3.0, or USB 3.2 signaling. In other embodiments, port 12*d*6 is sized and shaped as a USB Type-C receptacle configured for one or more of USB 2.0, USB 3.2, USB4, or Thunderbolt 3 or 4 signaling. In further embodiments, port 12*d*6 can be configured as an HDMI receptacle, a DisplayPort or Mini DisplayPort receptacle, an RJ45 receptacle for Ethernet, a 3.5 mm audio jack, a Lightning-type receptacle, or another standardized or proprietary connector associated with a selected communication protocol. The arrangement of sides 12*d*1-12*d*5 can provide keying features that ensure a single insertion orientation, reduce the likelihood of damage due to misalignment, and provide a visual indication of correct adapter orientation.

In implementations flex assembly 14 includes circumferential groove 14*a*, circumferential rib 14*b*, circumferential groove 14*c*, circumferential rib 14*d*, and circumferential rib 14*e*.

The alternating grooves and ribs of flex assembly 14 collectively define a region that is both flexible and easy to grip. In particular, circumferential grooves 14*a* and 14*c* present recessed regions that locally reduce wall thickness and thereby increase bending compliance of the flex assembly 14, while circumferential ribs 14*b*, 14*d*, and 14*e* remain relatively thicker to maintain structural integrity and resist collapse under axial compression. When adapter 10 is subjected to bending forces, such as when a connected cable is pushed or pulled sideways relative to a device port, the flex assembly 14 can be flexed to absorb the motion, thereby reducing peak stresses at the junction of the adapter and the respective connectors. In resilient implementations, the grooves and ribs cooperate with the elastomeric material so that flex assembly 14 returns substantially toward an original, unflexed configuration after the bending force is removed. In malleable implementations, the grooves and ribs cooperate with an internal plastically deformable element so that flex assembly 14 can be bent into a new configuration and remain in that flexed configuration until the user re-bends the adapter 10. For high-speed signaling protocols such as USB 3.2, USB4, Thunderbolt, HDMI 2.1, DisplayPort, or multi-gigabit Ethernet, the arrangement and depth of grooves 14*a* and 14*c* and ribs 14*b*, 14*d*, and 14*e* can be selected to promote smooth bending radii that reduce impedance discontinuities in the internal conductors.

In some implementations, the rib and groove pattern of flex assembly 14 may also provide a tactile index surface that a user can feel without visual inspection, enabling the user to instinctively orient the adapter 10 such that the port assembly 12 and plug assembly 16 face in desired directions. The profile of ribs 14*b*, 14*d*, and 14*e* may be rounded or slightly flattened to provide a comfortable contact surface against the user's fingers. In certain embodiments, the flex assembly 14 may be overmolded onto adjacent portions of port assembly 12 and plug assembly 16, creating a unitary structure that resists separation under repeated bending or repeated flexing into and out of a retained, flexed position.

In implementations plug assembly 16 include curvilinear side 16*a* with tapered side 16*a*1, ridge portion 16*a*2, tapered side 16*a*3, and side 16*a*4; curvilinear side 16*b* with angled side 16*b*1, ridge portion 16*b*2, and tapered side 16*b*3; top 16*c* inclined portion 16*c*1, ridge portion 16*c*2, and inclined portion 16*c*3; and plug end 16*d*.

The plug assembly 16 defines the opposite end of adapter 10 and is configured to mate with a complementary port on a host device or cable. The curvilinear side 16*a* incorporates tapered side 16*a*1 leading into ridge portion 16*a*2, which provides a pronounced raised feature that can be used for tactile identification of the plug side of adapter 10. Beyond ridge portion 16*a*2, tapered side 16*a*3 transitions toward side 16*a*4, collectively forming a profile that is easy to grasp during insertion and removal. On the opposing side, curvilinear side 16*b* includes angled side 16*b*1, ridge portion 16*b*2, and tapered side 16*b*3, thereby presenting a complementary ridge and taper arrangement that visually and tactilely differentiates plug assembly 16 from port assembly 12.

The top 16*c* includes inclined portion 16*c*1 leading up to ridge portion 16*c*2 and descending via inclined portion 16*c*3 toward plug end 16*d*. This ridge-and-incline arrangement can provide both visual emphasis and mechanical reinforcement at a region that may encounter thumb pressure during insertion. In some embodiments, ridge portion 16*c*2 is aligned with ridge portions 16*a*2 and 16*b*2 so that together they form a continuous tactile feature extending around plug assembly 16, thereby enhancing tactile identification of the plug assembly 16 by touch. Plug end 16*d* can be formed as a molded or overmolded region surrounding a conductive plug element, such as a metal blade or shell, or as a housing that retains a standardized plug component. The geometry of plug end 16*d* may, for example, mirror a USB Type-A plug, a USB Type-C plug, an HDMI plug, a DisplayPort or Mini DisplayPort plug, an RJ45 plug, a 3.5 mm audio plug, a Lightning-type plug, or another standardized or proprietary plug form factor associated with one or more of the communication protocols described herein, so that adapter 10 can be directly substituted for a conventional cable end while providing additional flex and ergonomic benefits.

Figure 2:
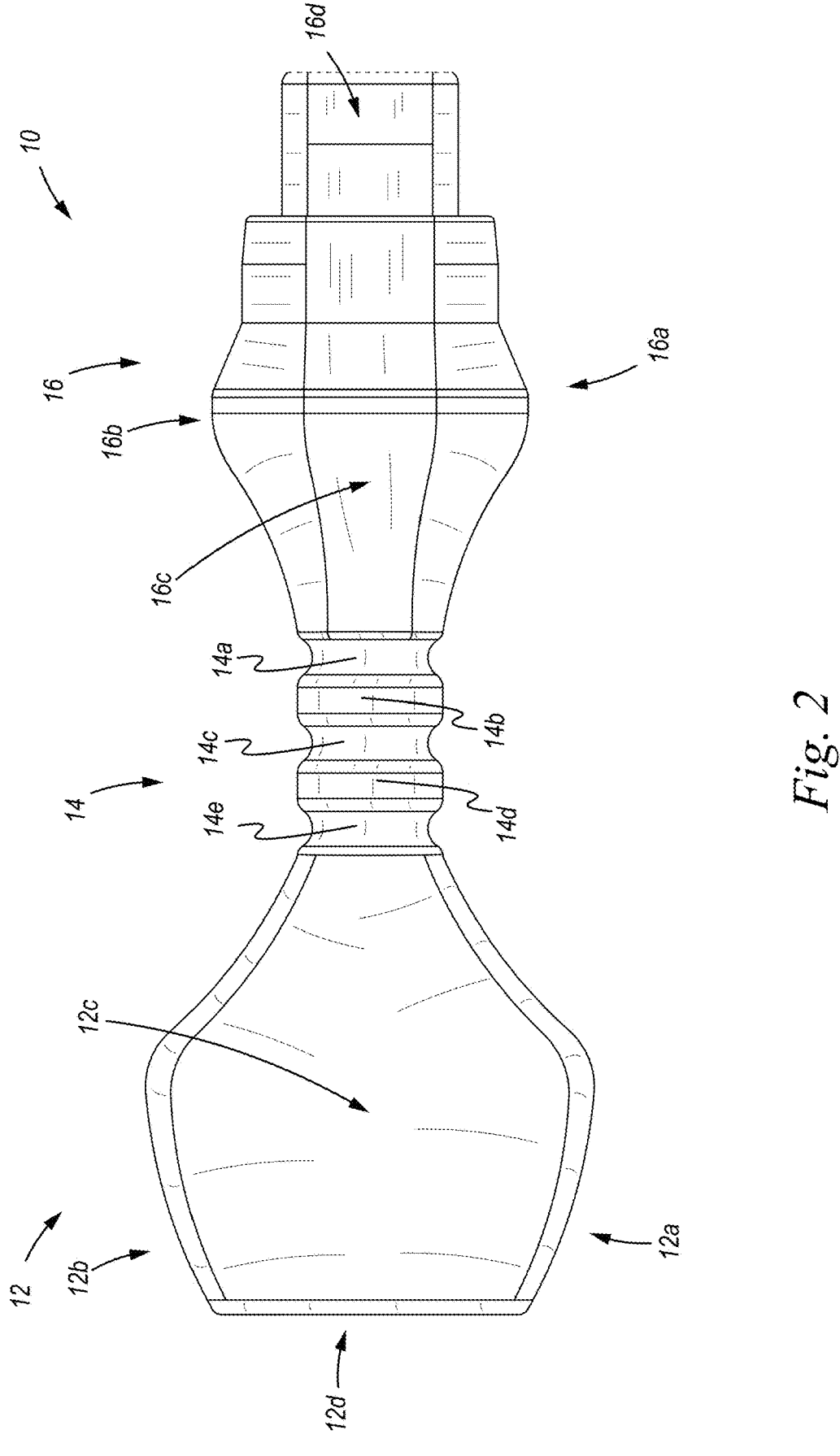
FIG. 2 is a top plan view of the communication adapter of FIG. 1.

Turning to FIG. 2, depicted therein is a top plan view of communication adapter 10.

In the top plan view of FIG. 2, the longitudinal relationship between port assembly 12, flex assembly 14, and plug assembly 16 is more clearly seen. The narrow portion 12*cl* of top 12*c* transitions into the series of grooves and ribs 14*a*-14*e* of flex assembly 14, which in turn transitions into inclined portion 16*cl* and ridge portion 16*c*2 of top 16*c*. From above, the adapter 10 exhibits a generally symmetrical profile about a central longitudinal axis extending from port end 12*d* to plug end 16*d*, although the specific curvatures and tapers of the sides 12*a*, 12*b*, 16*a*, and 16*b* can introduce subtle asymmetries that aid in orientation. The top plan view also illustrates that flex assembly 14 is located at or near the longitudinal center of adapter 10, which can distribute bending stresses more evenly between the two ends when either end is moved relative to the other.

Figure 3:
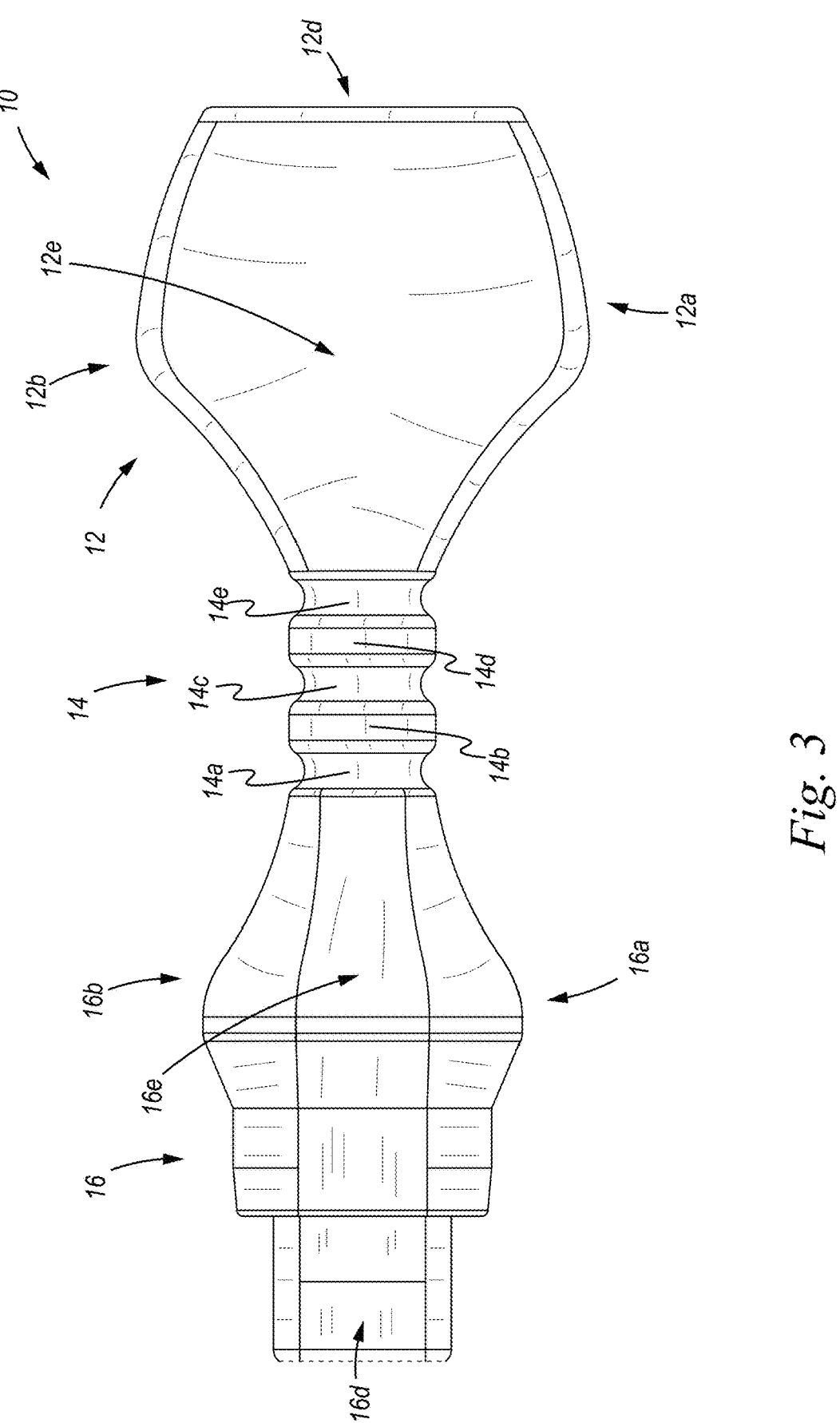
FIG. 3 is a bottom plan view of the communication adapter of FIG. 1.

Turning to FIG. 3, depicted therein is a bottom plan view of communication adapter 10 including bottom 12*e* and bottom 16*e*.

The bottom plan view of FIG. 3 illustrates bottom 12*e* of port assembly 12 and bottom 16*e* of plug assembly 16, which may have shapes and contours that echo those of the top 12*c* and top 16*c* while optionally including different surface features. For example, in some implementations, the bottom surfaces 12*e* and 16*e* may be flatter than their corresponding top surfaces to facilitate stable placement of adapter 10 on a flat support surface. The flex assembly 14 again appears as a sequence of alternating grooves and ribs, indicating that the flexible, compliant structure extends fully around the circumference of the adapter body. In certain embodiments, text, icons, or polarity indicators may be embossed or printed along bottom 12e or bottom 16e to convey branding, safety information, connector type information, or supported communication protocols.

Figure 4:
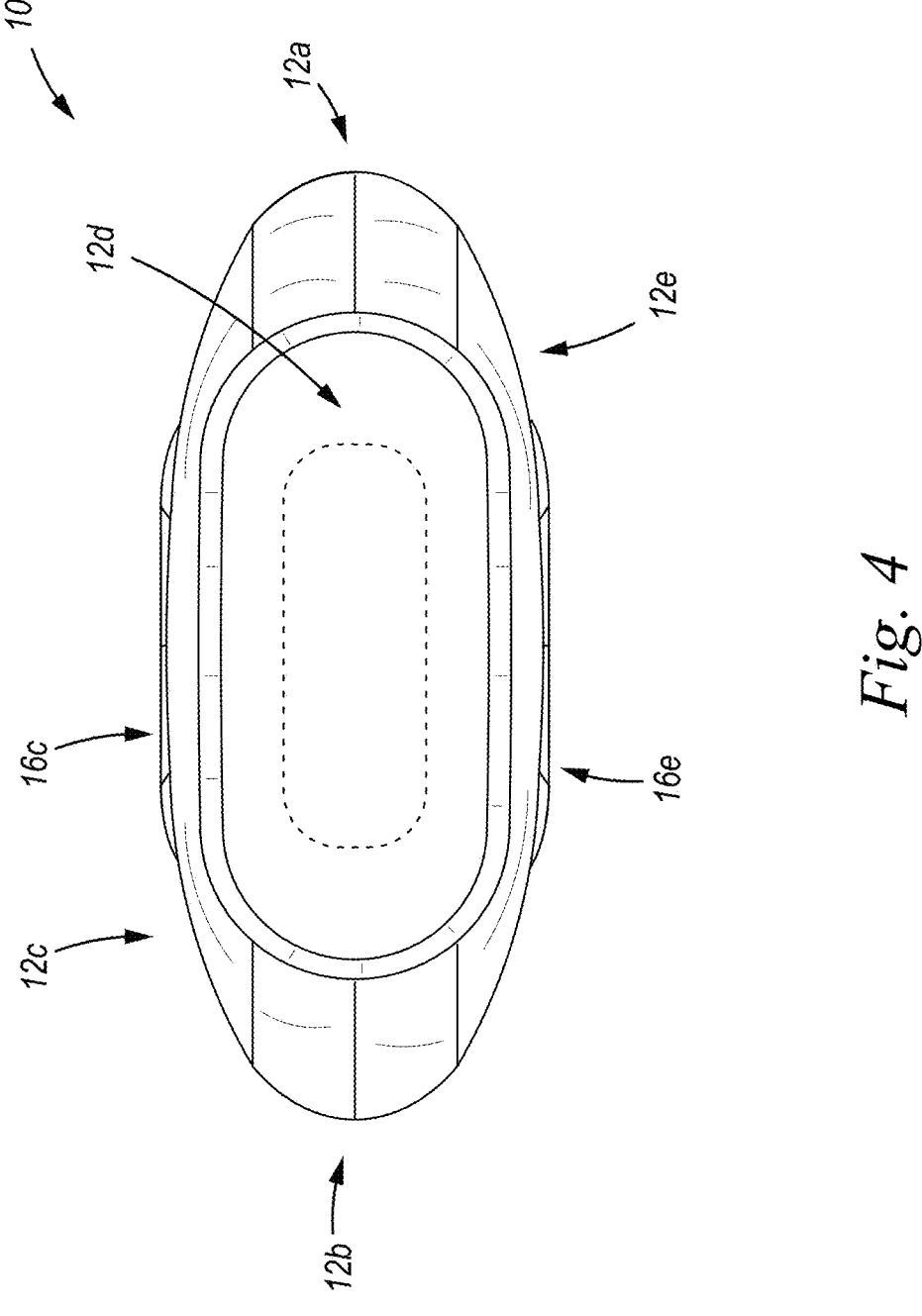
FIG. 4 is a port-end elevation view of the communication adapter of FIG. 1.

Turning to FIG. 4, depicted therein is a port-end elevation view of communication adapter 10.

In the port-end elevation view of FIG. 4, the port assembly 12 is seen head-on such that port 12d6 is centrally visible. The surrounding sides 12d1-12d5 define a frame around port 12d6 that may be rectangular, chamfered, or slightly rounded depending on implementation. The elevation view also shows top 12c and bottom 12e, as well as portions of sides 12a and 12b, thereby illustrating the overall port-end silhouette. In some implementations, the port-end silhouette can be designed to complement the exterior styling of a host device or to meet a specific ingress protection rating (e.g., IP-rated sealing) by including sealing surfaces or gaskets around the port 12d6. In embodiments where port 12d6 supports a specific communication protocol, visual markings such as icons (for example, a USB symbol, an HDMI symbol, or an Ethernet symbol) may be positioned adjacent to port 12d6 to identify the protocol.

Figure 5:
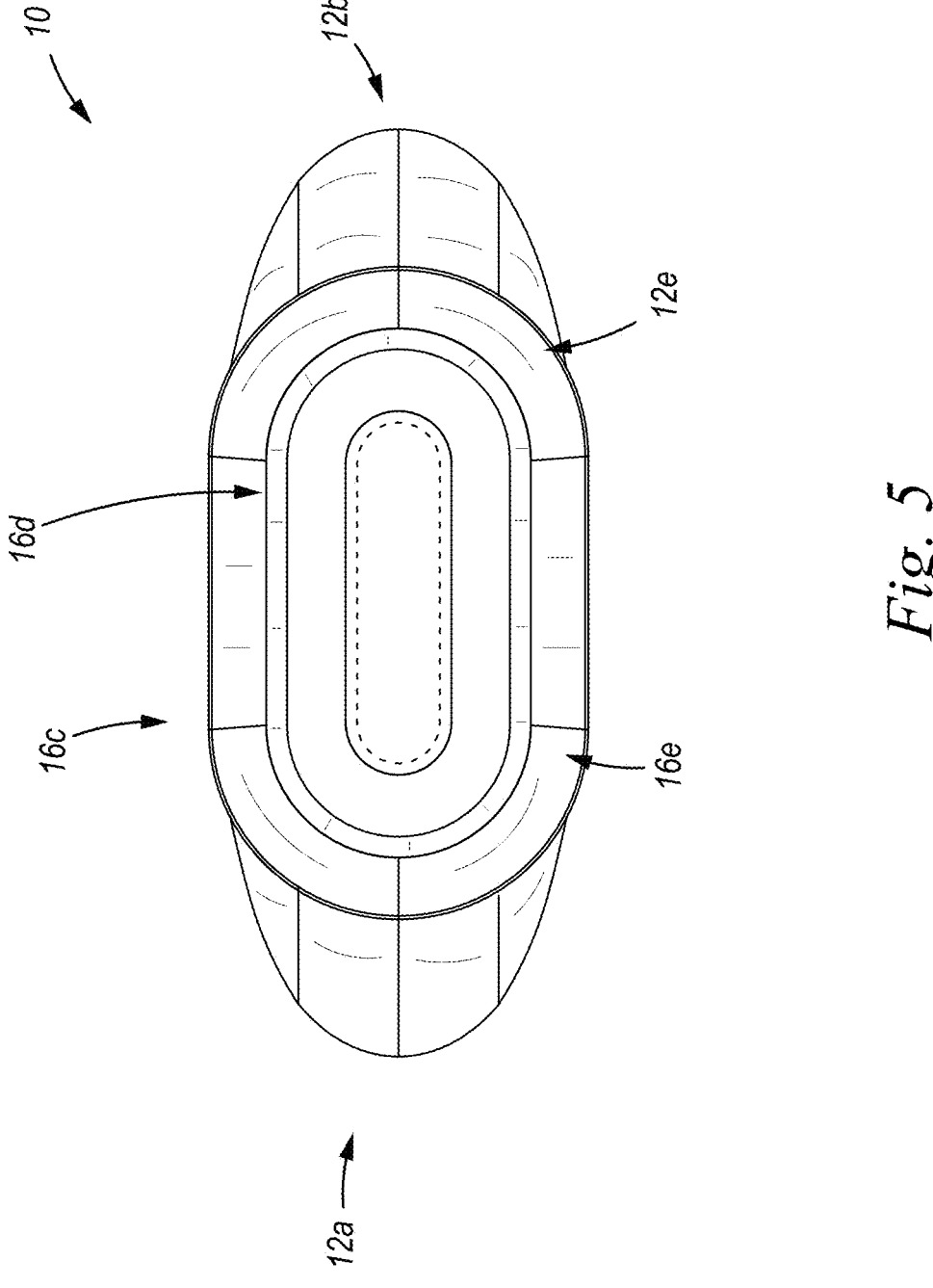
FIG. 5 is a plug-end elevational view of the communica-tion adapter of FIG. 1.

Turning to FIG. 5, depicted therein is a plug-end elevational view of communication adapter 10.

The plug-end elevational view of FIG. 5 presents plug end 16d and associated portions of plug assembly 16, including top 16c and bottom 16e, as well as sides 16a and 16b. From this view, plug end 16d can be seen having a cross-sectional shape appropriate to mate with a complementary receptacle. The silhouette may show ridge portion 16c2 and corresponding ridge portions along sides 16a and 16b, which together form a visually distinctive plug-end geometry. In certain embodiments, plug end 16d may include alignment tabs, bevelled edges, or other keying features that guide the plug assembly 16 into a mating port and reduce the possibility of incorrect insertion. As with port 12d6, plug end 16d may also be associated with markings or color coding to indicate a supported communication protocol, such as a blue insert for USB 3.x, a specific logo for HDMI or DisplayPort, or a distinct color band for a particular proprietary connector.

Figure 6:
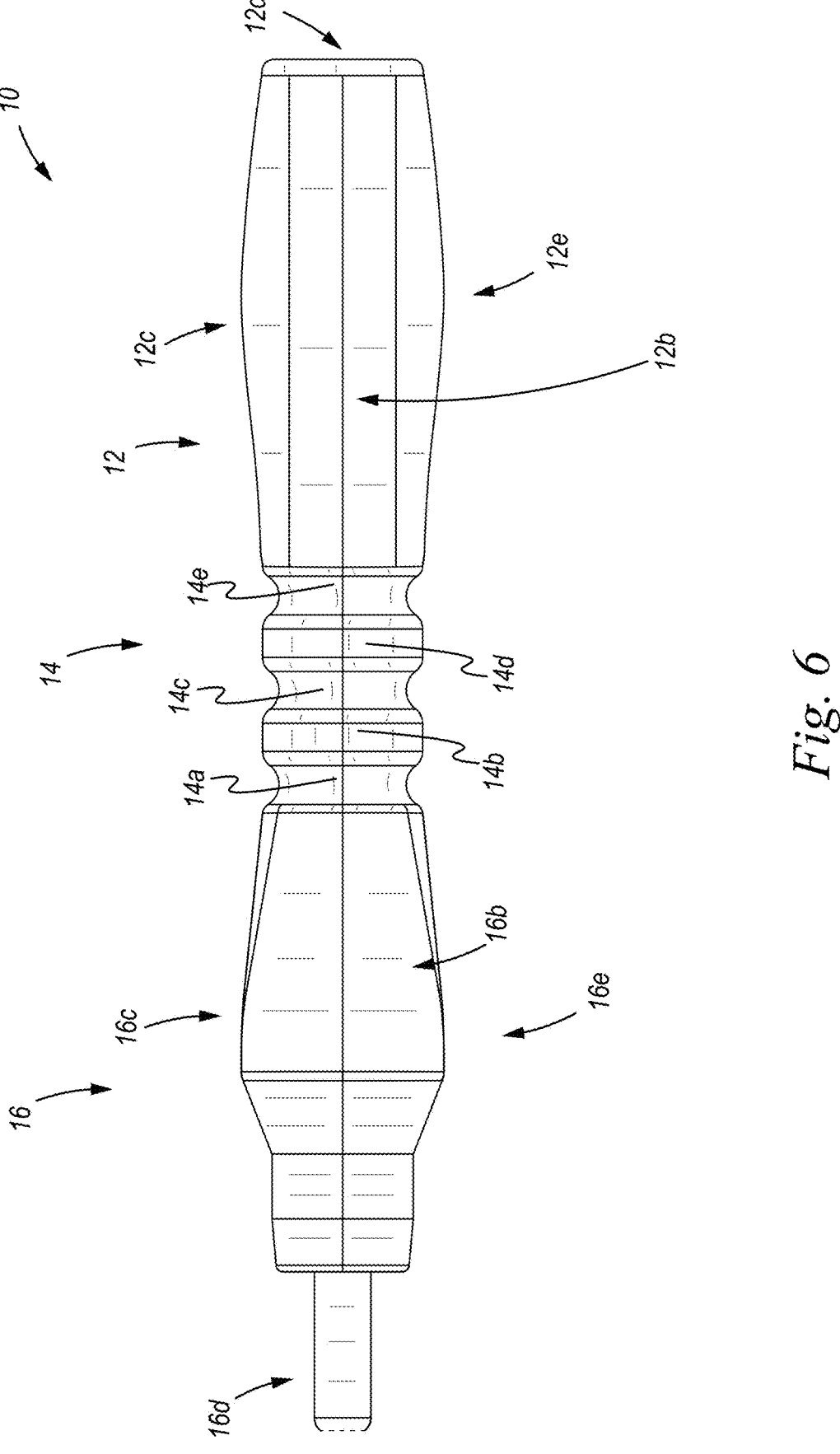
FIG. 6 is a first side elevational view of the communica-tion adapter of FIG. 1.

Turning to FIG. 6, depicted therein is a first side elevational view of communication adapter 10.

In the first side elevational view of FIG. 6, communication adapter 10 is shown such that a curvilinear side associated with port assembly 12 (for example, side 12b) and the corresponding side of plug assembly 16 (for example, side 16b) are visible along with flex assembly 14. This view highlights the progression of tapered surfaces and ridge portions, as well as the relative vertical offsets between top 12c, bottom 12e, top 16c, and bottom 16e. The first side elevational view also illustrates how the grooves and ribs of flex assembly 14 span the full vertical height of the adapter between top and bottom surfaces, providing flexural compliance while maintaining a consistent aesthetic band around the adapter.

Figure 7:
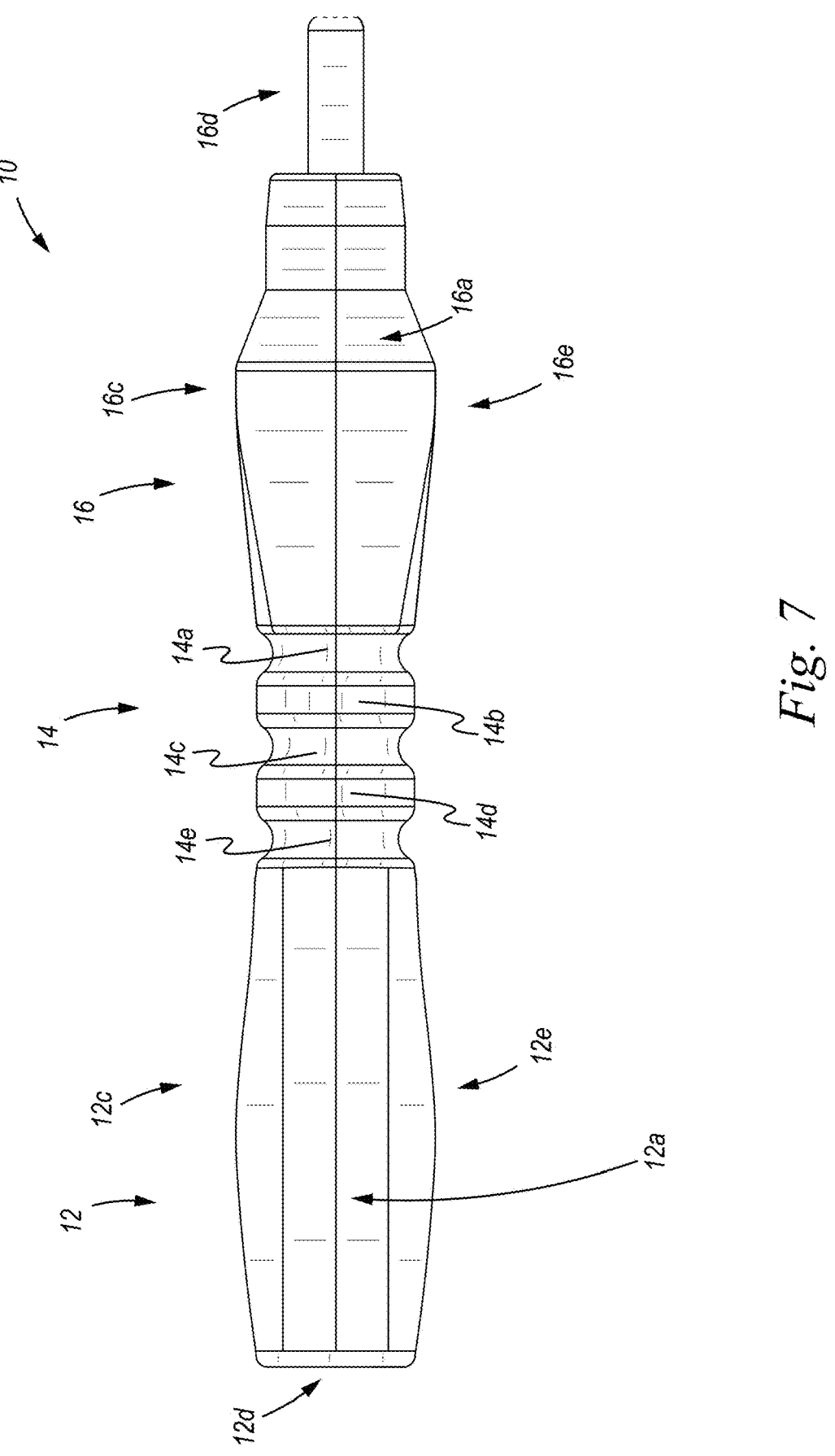
FIG. 7 is a second side elevational view of the commu-nication adapter of FIG. 1.

Turning to FIG. 7, depicted therein is a second side elevational view of communication adapter 10.

The second side elevational view of FIG. 7 presents the opposite lateral side of adapter 10, for example showing curvilinear side 12a of port assembly 12 and curvilinear side 16a of plug assembly 16 in combination with flex assembly 14. In this view, angled side 12a1, corner 12a2, and tapered side 12a3 may be contrasted with tapered side 16a1, ridge portion 16a2, tapered side 16a3, and side 16a4, thereby revealing that the first and second sides of adapter 10 may have deliberate asymmetries. These asymmetries can be used to provide visual or tactile cues as to which end of the adapter is the port end and which is the plug end, even in low-light conditions, and can be combined with protocol-specific markings or textures that correspond to the connector type and protocol supported at each end.

Figure 8:
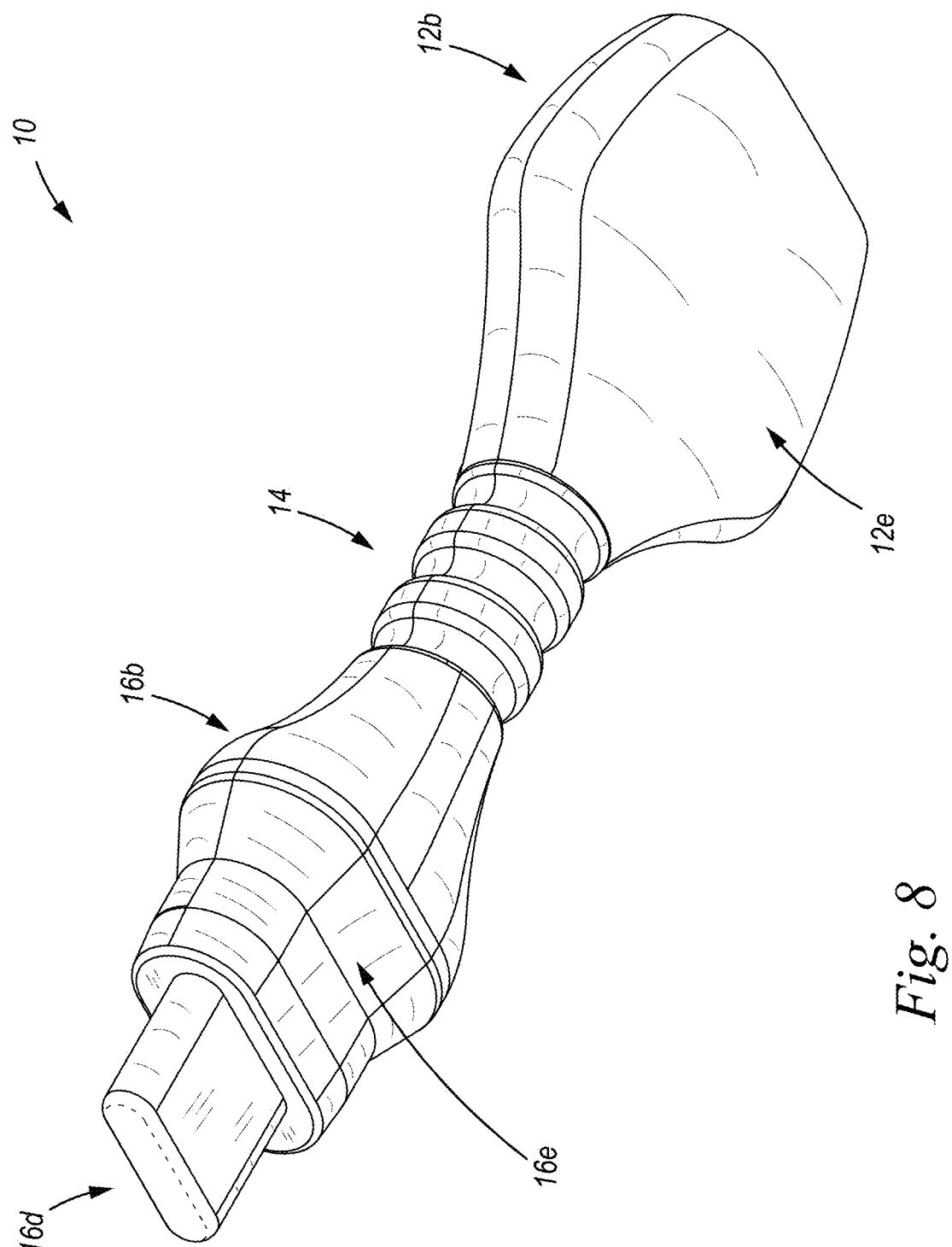
FIG. 8 is a plug-end perspective view of the communi-cation adapter of FIG. 1.

Turning to FIG. 8, depicted therein is a plug-end perspective view of communication adapter 10.

In the plug-end perspective view of FIG. 8, plug assembly 16 is oriented toward the viewer, and port assembly 12 extends rearwardly. This perspective shows how ridge portions 16a2, 16b2, and 16c2 blend into adjacent tapered or inclined surfaces 16a1, 16a3, 16b1, 16b3, 16c1, and 16c3 to form a cohesive plug-end profile. The flex assembly 14 is visible between the port and plug assemblies and appears as a band of alternating grooves and ribs around the center of adapter 10. From this view, a user can appreciate the ergonomic recesses and raised portions that may be engaged by the thumb and fingers when gripping adapter 10 for insertion or removal, whether the plug end 16d is configured, for example, as a USB Type-C plug for USB4/Thunderbolt, an HDMI plug, or an RJ45 plug for Ethernet.

Figure 9:
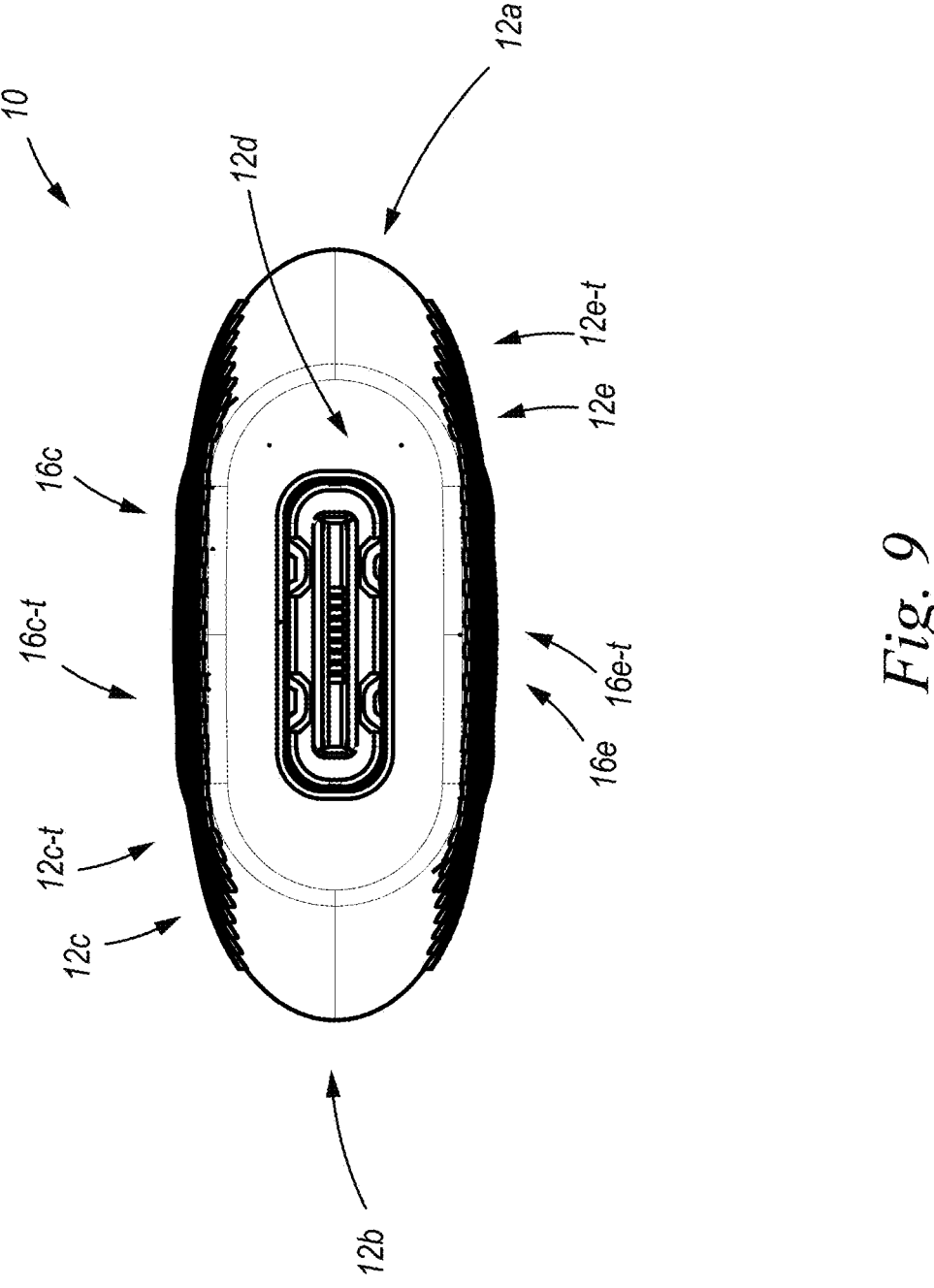
FIG. 9 is port-end elevation view of a textured version of the communication adapter of FIG. 1.

Turning to FIG. 9, depicted therein is port-end elevation view of a textured version of communication adapter 10 including texture 12c-t, texture 12e-t, texture 16c-t, and texture 16e-t.

The textured version of adapter 10 shown in FIG. 9 incorporates additional textures along top 12c and bottom 12e of port assembly 12 and top 16c and bottom 16e of plug assembly 16. Texture 12c-t and texture 12e-t together define a first textured grip region on port assembly 12, and texture 16c-t and texture 16e-t together define a second textured grip region on plug assembly 16. The textured grip regions may be provided as arrays of raised bumps, ridges, grooves, hatching, or knurling patterns that increase friction between the user's fingers and the adapter body. The port-end elevation view illustrates that the textured regions can be bounded within selected areas to maintain a clean aesthetic and prevent interference with mating connectors or sealing surfaces around the port 12d6. In some versions, texture patterns may be differentiated between connector types, for example using one pattern for USB-based connectors and another pattern for video-oriented connectors such as HDMI or DisplayPort.

Figure 10:
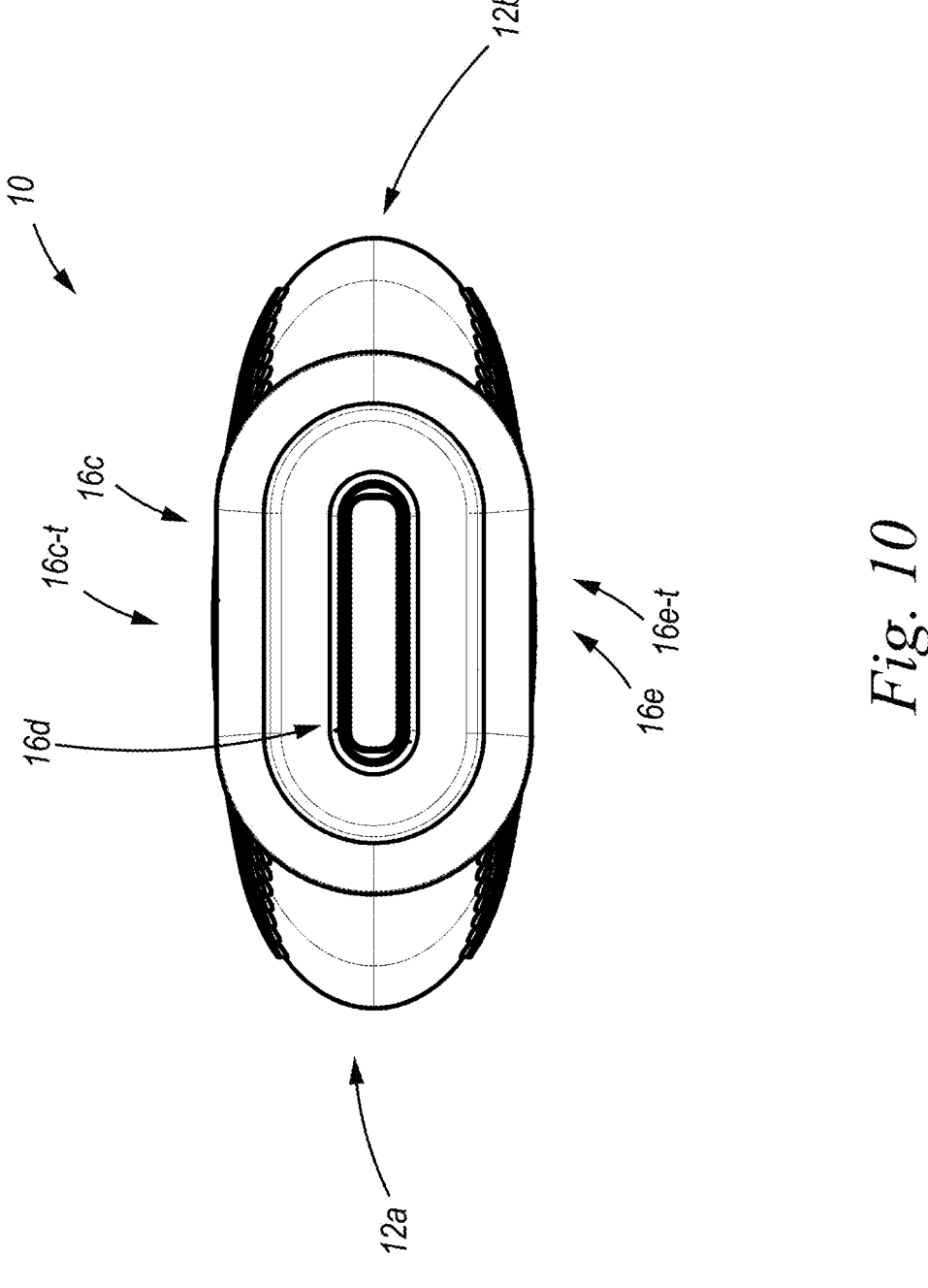
FIG. 10 is plug-end elevation view of the textured version of the communication adapter of FIG. 1.

Turning to FIG. 10, depicted therein is plug-end elevation view of the textured version of communication adapter 10.

In the plug-end elevation view of FIG. 10, texture 16c-t and texture 16e-t are again visible on top 16c and bottom 16e, respectively, while the port assembly 12 appears in the background. The textured grip region defined by texture 16c-t and texture 16e-t can be configured to provide a distinctive touch sensation relative to smooth regions of the adapter, thereby enabling a user to identify the plug end of adapter 10 by touch alone. In some implementations, the textures may differ between port assembly 12 and plug assembly 16 (for example, using a more aggressive pattern on one end than the other) to further reinforce end identification and potentially differentiate between connector types or supported communication protocols. The textured grip regions thus cooperate with the ridge and taper features of adapter 10 to increase friction between the communication adapter system and a hand of a user during insertion and removal.

Figure 11:
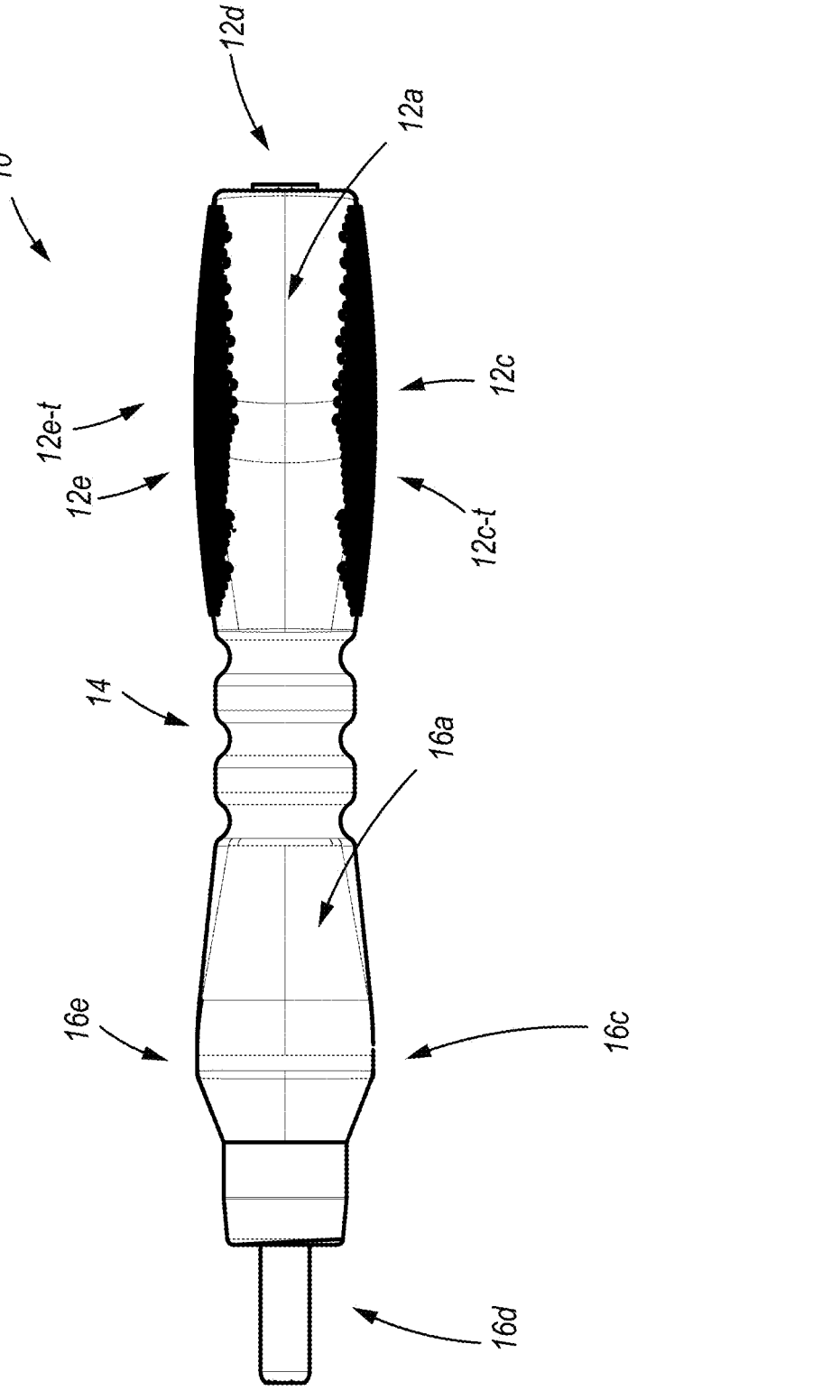
FIG. 11 is a side elevational view of the textured version of the communication adapter of FIG. 1.

Turning to FIG. 11, depicted therein is a side elevational view of the textured version of communication adapter 10.

The side elevational view of FIG. 11 shows that texture 12*c-t* and texture 12*e-t* extend along at least a portion of the length of port assembly 12, while texture 16*c-t* and texture 16*e-t* extend along at least a portion of the length of plug assembly 16. In one implementation, the textures may be aligned with ridge portions and tapers to create visual stripes or bands that both break up the overall silhouette and highlight functional grip regions. The flex assembly 14 may remain relatively smooth or may include its own fine texture, depending on desired feel and manufacturing consider- ations. Providing texturing primarily on the more rigid port and plug assemblies can preserve the flexing characteristics of the central flex assembly 14 while still enabling differ- entiation between, for example, an HDMI port end and a USB Type-C plug end based on touch and appearance. The textured grip regions may be incorporated into any of the embodiments described herein, including communication adapters configured for use with any of the communication protocols identified above.

Figure 12:
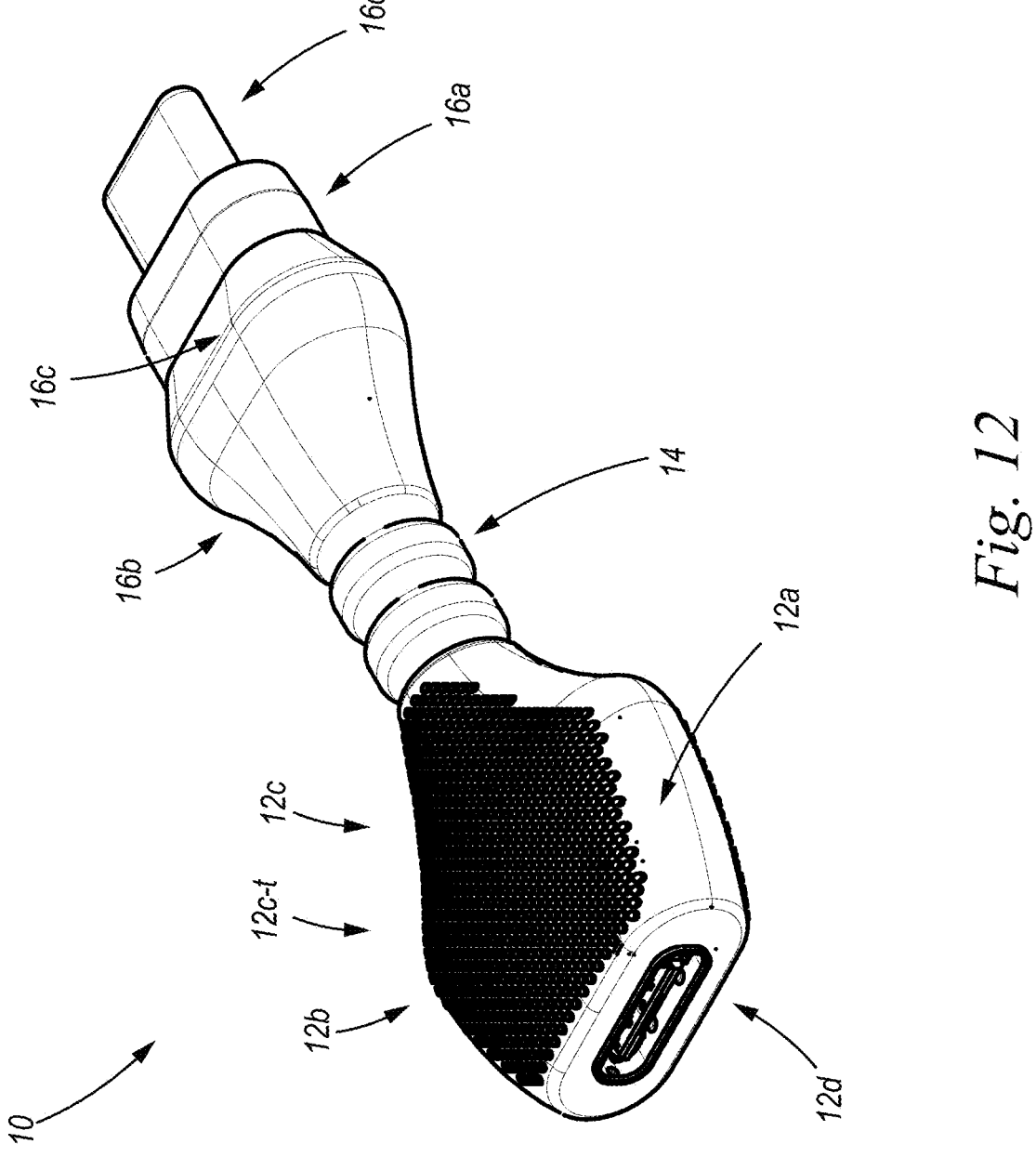
FIG. 12 is a port-end perspective view of the textured version of the communication adapter of FIG. 1.

Turning to FIG. 12, depicted therein is a port-end per- spective view of the textured version of communication adapter 10.

In the port-end perspective view of FIG. 12, port assem- bly 12 is again oriented toward the viewer, and the interplay between smooth and textured regions is readily visible. Texture 12*c-t* on top 12*c* and texture 12*e-t* on bottom 12*e* may be seen to wrap partially around sides 12*a* and 12*b*, creating a continuous tactile band that encircles port assem- bly 12 at selected locations. In some implementations, the texture band may align with or frame a logo or symbol representing the type of connector provided at port 12*d*6 and the communication protocol supported at that end, so that a user can immediately recognize, for example, a USB Type-A port configured for USB 3.2 or an HDMI port configured for HDMI 2.1. The flex assembly 14 and plug assembly 16 appear in the background, with texture 16*c-t* and texture 16*e-t* also visible, demonstrating that the textured treatment can be applied in a coordinated fashion along the length of adapter 10.

Figure 13:
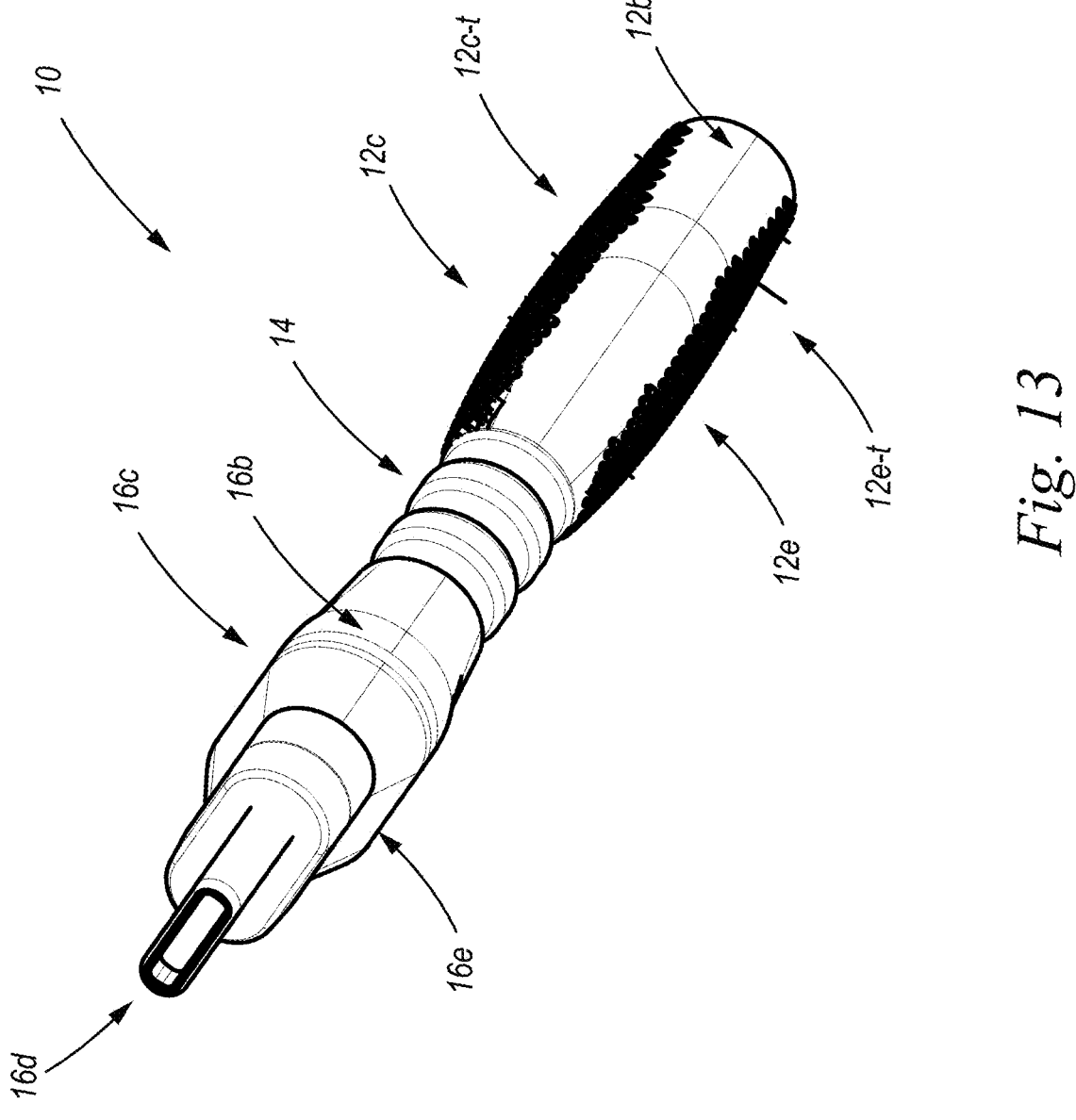
FIG. 13 is a plug-end perspective view of the textured version of the communication adapter of FIG. 1.

Turning to FIG. 13, depicted therein is a plug-end per- spective view of the textured version of communication adapter 10.

In the plug-end perspective view of FIG. 13, plug assem- bly 16 is oriented toward the viewer, clearly showing texture 16*c-t* on top 16*c* and texture 16*e-t* on bottom 16*e* in combination with the ridge and taper features previously described. The perspective highlights how the textured regions can be positioned where the user's thumb and forefinger naturally rest when grasping adapter 10 for use. In some embodiments, the textured version of adapter 10 may be offered as a separate model from a smooth-surface version, thereby providing users with options based on personal preference, environmental conditions (for example, use with gloves or in wet environments), or branding con- siderations, and may be tailored to particular connector and protocol combinations, such as a dedicated USB Type-C to HDMI adapter, a USB Type-A to USB Type-C adapter, or an Ethernet to USB adapter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "includ- ing but not limited to," the term "having" should be inter- preted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims con- taining only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addi- tion, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analo- gous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further under- stood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may gen- erally be performed in any order. Also, although various operational flows are presented in a sequence(s), it should be understood that the various operations may be performed in other orders than those which are illustrated, or may be performed concurrently. Examples of such alternate order- ings may include overlapping, interleaved, interrupted, reor- dered, incremental, preparatory, supplemental, simultane- ous, reverse, or other variant orderings, unless context dictates otherwise. Furthermore, terms like "responsive to,"

"related to," or other past-tense adjectives are generally not intended to exclude such variants, unless context dictates otherwise.

What is claimed is:

1. A communication adapter system for coupling a first communication interface and a second communication interface, the communication adapter system comprising:
   (I) a port assembly couplable with the first communication interface;
   (II) a plug assembly couplable with the second communication interface; and
   (III) a flex assembly extending between the port assembly and the plug assembly and configured to allow the port assembly and the plug assembly to flex with respect to one another,
   wherein the first communication interface and the second communication interface are each configured to carry a communication signal associated with at least one communication protocol
   wherein the port assembly includes:
   a first curvilinear side,
   a second curvilinear side positioned opposite from the first curvilinear side,
   a top extending between the first curvilinear side and the second curvilinear side, and
   a bottom extending between the first curvilinear side and the second curvilinear side.

2. The communication adapter system of claim 1, wherein the top of the port assembly includes:
   a narrow portion positioned closer to the flex assembly than to a port end of the port assembly,
   a middle portion extending from the narrow portion, and
   an end portion extending from the middle portion toward the port end of the port assembly.

3. The communication adapter system of claim 1, wherein the port assembly includes a port end having:
   a port opening, and
   a plurality of port-end sides surrounding the port opening,
   wherein the plurality of port-end sides are arranged to key the port opening for a single insertion orientation of a mating connector.

4. A communication adapter system for coupling a first communication interface and a second communication interface, the communication adapter system comprising:
   (I) a port assembly couplable with the first communication interface;
   (II) a plug assembly couplable with the second communication interface; and
   (III) a flex assembly extending between the port assembly and the plug assembly and configured to allow the port assembly and the plug assembly to flex with respect to one another,
   wherein the first communication interface and the second communication interface are each configured to carry a communication signal associated with at least one communication protocol
   wherein the flex assembly includes:
   a first circumferential groove,
   a first circumferential rib adjacent to the first circumferential groove,
   a second circumferential groove adjacent to the first circumferential rib, and
   a second circumferential rib adjacent to the second circumferential groove, wherein the first circumferential groove and the second circumferential groove locally reduce a wall thickness of the flex assembly to increase bending compliance of the flex assembly.

5. The communication adapter system of claim 4,
   wherein the flex assembly defines a medial region having a reduced cross-sectional profile relative to adjacent portions of the port assembly and adjacent portions of the plug assembly, and
   wherein the medial region is positioned substantially midway between the port assembly and the plug assembly.

6. A communication adapter system for coupling a first communication interface and a second communication interface, the communication adapter system comprising:
   (I) a port assembly couplable with the first communication interface;
   (II) a plug assembly couplable with the second communication interface; and
   (III) a flex assembly extending between the port assembly and the plug assembly and configured to allow the port assembly and the plug assembly to flex with respect to one another,
   wherein the first communication interface and the second communication interface are each configured to carry a communication signal associated with at least one communication protocol
   wherein the plug assembly includes:
   a first plug-side surface having a first tapered portion, a first ridge portion, and a second tapered portion, and
   a second plug-side surface positioned opposite from the first plug-side surface and having a second tapered portion, a second ridge portion, and a third tapered portion,
   wherein the first ridge portion and the second ridge portion define tactile features for identifying the plug assembly by touch.

7. The communication adapter system of claim 6,
   wherein the plug assembly further includes a plug top having:
   a first inclined portion extending from the flex assembly,
   a plug ridge portion extending from the first inclined portion, and
   a second inclined portion extending from the plug ridge portion toward a plug end of the plug assembly,
   wherein the plug ridge portion is aligned with at least one of the first ridge portion and the second ridge portion.

8. A communication adapter system for coupling a first communication interface and a second communication interface, the communication adapter system comprising:
   (I) a port assembly couplable with the first communication interface;
   (II) a plug assembly couplable with the second communication interface; and
   (III) a flex assembly extending between the port assembly and the plug assembly and configured to allow the port assembly and the plug assembly to flex with respect to one another,
   wherein the first communication interface and the second communication interface are each configured to carry a communication signal associated with at least one communication protocol
   wherein the port assembly and the plug assembly are formed of a rigid or semi-rigid polymer material, and
   wherein the flex assembly is formed of an elastomeric material having greater flexibility than the rigid or semi-rigid polymer material, wherein the flex assembly is configured to flex in response to a bending force applied between the port assembly and the plug assembly and to return toward an unflexed configuration when the bending force is removed.

9. The communication adapter system of claim 8, wherein at least one of the first communication interface and the second communication interface is configured to carry at least one communication protocol selected from the group consisting of:

USB 1.1, USB 2.0, USB 3.0, USB 3.1, USB 3.2, USB4, a USB Type-A connector protocol, a USB Type-B connector protocol, a USB micro-B connector protocol, a USB mini-B connector protocol, a USB Type-C connector protocol, Thunderbolt 3, Thunderbolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol.

10. A communication adapter system for coupling a first communication interface and a second communication interface, the communication adapter system comprising:

(I) a port assembly couplable with the first communication interface;

(II) a plug assembly couplable with the second communication interface; and (III) a flex assembly extending between the port assembly and the plug assembly, the flex assembly including (A) an elastomeric body, and (B) an internal plastically deformable member positioned within the elastomeric body, wherein the flex assembly is configured to be bent into a flexed configuration and to retain the flexed configuration until the flex assembly is re-bent into a different configuration, and wherein at least one of the first communication interface and the second communication interface is configured to carry a communication protocol wherein the elastomeric body of the flex assembly surrounds the internal plastically deformable member and defines a plurality of circumferential grooves and circumferential ribs, wherein the circumferential grooves are configured to concentrate bending of the flex assembly near the internal plastically deformable member, and wherein the circumferential ribs are configured to maintain an external profile of the flex assembly under bending.

11. The communication adapter system of claim 10, wherein the internal plastically deformable member includes a metal wire embedded within the elastomeric body of the flex assembly.

12. The communication adapter system of claim 10, wherein the metal wire extends along a longitudinal axis of the flex assembly from a region adjacent to the port assembly to a region adjacent to the plug assembly, and wherein the metal wire has a yield strength selected to allow manual bending by a user while resisting unintentional bending during normal use.

13. A communication adapter system for coupling a first communication interface and a second communication interface, the communication adapter system comprising:

(I) a port assembly couplable with the first communication interface;

(II) a plug assembly couplable with the second communication interface; and (III) a flex assembly extending between the port assembly and the plug assembly, the flex assembly including (A) an elastomeric body, and (B) an internal plastically deformable member positioned within the elastomeric body, wherein the flex assembly is configured to be bent into a flexed configuration and to retain the flexed configuration until the flex assembly is re-bent into a different configuration, and wherein at least one of the first communication interface and the second communication interface is configured to carry a communication protocol wherein the port assembly is overmolded onto a first end of the elastomeric body, and wherein the plug assembly is overmolded onto a second end of the elastomeric body opposite from the first end of the elastomeric body, wherein the overmolding forms a unitary structure that resists separation of the port assembly, the flex assembly, and the plug assembly when the flex assembly is repeatedly bent into and out of the flexed configuration.

14. The communication adapter system of claim 13, wherein at least one of the first communication interface and the second communication interface is configured to carry at least one communication protocol selected from the group consisting of:

USB 1.1, USB 2.0, USB 3.0, USB 3.1, USB 3.2, USB4, a USB Type-A connector protocol, a USB Type-B connector protocol, a USB micro-B connector protocol, a USB mini-B connector protocol, a USB Type-C connector protocol, Thunderbolt 3, Thunderbolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol, wherein the flex assembly is configured to retain a flexed configuration that provides strain relief for at least one connector associated with the communication protocol.

15. A communication adapter system for coupling a first communication interface and a second communication interface, the communication adapter system comprising:

(I) a port assembly couplable with the first communication interface;

(II) a plug assembly couplable with the second communication interface;

(III) a flex assembly extending between the port assembly and the plug assembly; and (IV) textured grip regions including (A) a first textured grip region positioned on the port assembly, and (B) a second textured grip region positioned on the plug assembly, wherein the first textured grip region and the second textured grip region are configured to increase friction between the communication adapter system and a hand of a user, and wherein the communication adapter system is configured for use with at least one communication protocol wherein the first textured grip region includes a first textured top portion and a first textured bottom portion on the port assembly, and wherein the second textured grip region includes a second textured top portion and a second textured bottom portion on the plug assembly, wherein the first textured top portion and the second textured top portion are aligned with one another along a longitudinal axis of the communication adapter system.

16. A communication adapter system for coupling a first communication interface and a second communication interface, the communication adapter system comprising:

(I) a port assembly couplable with the first communication interface;

(II) a plug assembly couplable with the second communication interface;

(III) a flex assembly extending between the port assembly and the plug assembly; and (IV) textured grip regions including (A) a first textured grip region positioned on the port assembly, and (B) a second textured grip region positioned on the plug assembly, wherein the first textured grip region and the second textured grip region are configured to increase friction between the communication adapter system and a hand of a user, and wherein the communication adapter system is configured for use with at least one communication protocol wherein at least one of the first textured grip region and the second textured grip region includes a plurality of raised ridges extending in a direction transverse to a longitudinal axis of the communication adapter system, and wherein at least one of the raised ridges is aligned with a ridge portion of the plug assembly configured to be engaged by a thumb of the user.

17. The communication adapter system of claim 16, wherein the port assembly includes a port opening sized and shaped to receive a connector for at least one communication protocol selected from the group consisting of:

USB 1.1, USB 2.0, USB 3.0, USB 3.1, USB 3.2, USB4, a USB Type-A connector protocol, a USB Type-B connector protocol, a USB micro-B connector protocol, a USB mini-B connector protocol, a USB Type-C connector protocol, Thunderbolt 3, Thunderbolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol, and wherein the plug assembly includes a plug end sized and shaped to mate with a connector for at least one communication protocol selected from the group consisting of:

USB 1.1, USB 2.0, USB 3.0, USB 3.1, USB 3.2, USB4, a USB Type-A connector protocol, a USB Type-B connector protocol, a USB micro-B connector protocol, a USB mini-B connector protocol, a USB Type-C connector protocol, Thunderbolt 3, Thunderbolt 4, HDMI 1.4, HDMI 2.0, HDMI 2.1, DisplayPort, Mini DisplayPort, DisplayPort Alternate Mode over USB Type-C, DVI, VGA, 10BASE-T Ethernet, 100BASE-TX Ethernet, 1000BASE-T Ethernet via RJ45, RS-232, RS-485, I2C, SPI, CAN bus, a 3.5 mm TRS audio protocol, a 3.5 mm TRRS audio protocol, a Lightning-type protocol, and a proprietary charging or data protocol.

* * * * *